(No Model.)

A. H. OVERMAN.
RUBBER TIRE FOR VEHICLE WHEELS.

No. 450,816. Patented Apr. 21, 1891.

Witnesses
Chas B. Shumway
Seligman Zunder

Inventor
Albert H. Overman
By Earle Seymour
Attys.

UNITED STATES PATENT OFFICE.

ALBERT H. OVERMAN, OF SPRINGFIELD, MASSACHUSETTS, ASSIGNOR TO THE OVERMAN WHEEL COMPANY, OF HARTFORD, CONNECTICUT.

RUBBER TIRE FOR VEHICLE-WHEELS.

SPECIFICATION forming part of Letters Patent No. 450,816, dated April 21, 1891.

Application filed July 16, 1890. Serial No. 358,977. (No model.)

*To all whom it may concern:*

Be it known that I, ALBERT H. OVERMAN, of Springfield, in the county of Hampden and State of Massachusetts, have invented new Improvements in Rubber Tires for Vehicle-Wheels; and I do hereby declare the following, when taken in connection with the accompanying drawings and the letters of reference marked thereon, to be a full, clear, and exact description of the same, and which said drawings constitute part of this specification, and represent, in—

Figure 1:
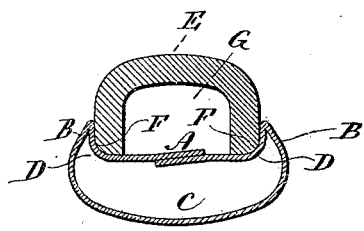
Figure 2:
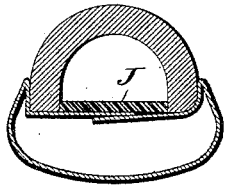

Figure 1, a transverse section of one form which my improved tire may assume and one form of rim to which it may be applied; Fig. 2, a similar view showing another form of tire and rim which my invention may assume.

My invention relates to an improved rubber tire for vehicle-wheels, the object being to adapt the tire to overcome vibration by constructing it to cushion freely, to increase the stability of the wheel by adapting the tire to present when under pressure a virtually flat tread to the road-bed, and to lighten and cheapen the tire by reducing the amount of rubber ordinarily employed.

With these ends in view my invention consists in a rubber tire having certain details of construction and combinations of parts, as will be hereinafter described, and pointed out in the claims.

The broad hollow wheel-rim, as herein shown, is made of folded sheet metal, the edges whereof are lapped in the center of its flat bed A, which is depressed between two retaining-flanges B B, forming narrow radial extensions of the body portion C of the rim, rounded corners D D being formed between the edges of the bed and the inner walls of the flanges. If desired, the rounded corners referred to above may be made square, although the rounded form is preferred, as it is easier to make, stronger, and enables a firmer attachment of the tire to be secured than can be had with the square form. Such a rim as described is well adapted to the purposes of my invention, although I do not limit myself to its proportions or construction, nor to a hollow rim or a rim having a flat bed, my primary object, as far as the rim is concerned, being to employ one construction to form two annular seats arranged to extend transversely under the edges of the tire, which have edgewise bearing upon them.

The broad and low rubber tire E is arch-shaped in transverse section, substantially uniform in thickness, and of sufficient body to be normally self-sustaining and has a wide unoccupied arch-shaped interior space rising above its center and of large size relative to the entire dimensions of the tire, which, as herein shown, is nowhere broader than at its base, whereby it is rendered stabler than arched tires having contracted bases. The sides of the tire are adapted to take edgewise bearing substantially in the plane of the wheel and are thereto provided with suitable bases, which, as shown, are substantially flat and seated squarely upon the edges of the bed A of the wheel-rim and abut against the inner walls of the retaining-flanges B B thereof, their outer faces being rounded at their lower extremities, as at F F, to adapt them to conform to the rounded corners D D, before described, the said flanges giving the sides of the tire lateral support, and hence guarding against slipping of the wheel.

By adapting the sides of an arch-shaped tire having a large interior space to take an edgewise bearing in the plane of the wheel upon seats extending transversely under them the sides of the tire are under the weight imposed upon them compressed and rendered stiffer than its middle or crowning portion, which is inwardly displaced between them to form a virtually flat tread which secures stability, and hence safety, to the wheel and security and comfort to the rider, the weight of the wheel and rider being exerted in parallel radial lines, which virtually include the yielding crown or middle portion of the tire between them.

By making the expansion-space of large size relative to the dimensions of the entire tire, as specified, the tire may be considerably indented and sufficiently to so far conform to the inequalities of the road-bed that the rider will not be sensible to the shocks of passing over stones, pavements, and like objects. This effect cannot be secured unless the said space is large relative to the entire tire. The retaining flanges of the rim re-enforce the tire laterally and prevent its lateral displacement, and thereby avoid the danger of slipping sidewise, which wheels having hollow tires are liable to do. The air inclosed in the said space acts as a cushion therein and supplements the action of the rubber in overcoming vibration and absorbing the jar of travel over an uneven road-bed; but I rely mainly upon self-sustaining and reacting elasticity of the rubber and upon its being shaped in such an arch-shaped form as will secure an ample unoccupied interior space for its inward displacement and an edgewise bearing for its sides upon seats extending transversely under them.

Compared with the rims and tires heretofore generally used, the rim herein shown is broad and its tread wide, while the tire is correspondingly broad and low. It will be particularly noted that the interior space in the tire extends sufficiently beyond a plane joining the outer edges of the retaining flanges of the rim to permit a free inward displacement of so much of the tire as lies outside of that plane. It should be observed, also, that my improved arch-shaped tire partakes of the characteristics of all arch-shaped structures, so that, although lighter and thinner than solid tires, it yet possesses the required resistance. By properly proportioning it in thickness any desired amount of resistance may be secured.

The construction shown by Fig. 2 of the drawings represents an arch-shaped tire, which crowns more than the tire illustrated in the other figure, and has one of its bases shaped in accordance with the other figure, while its other base is shaped to fit into a square instead of a round corner. A thin flat strip J of wood, paper, or equivalent light material is placed upon the bed of the rim between the sides of the tire and keeps the same from canting inwardly when the tire is being applied to the rim, the said strip bearing upon and encircling the bed of the tire and having its ends secured together in any convenient manner. Being located at the bottom of the arch, this strip does not interfere with the cushioning action of the tire.

I am aware that it is old to make hollow tires which are not self-sustaining, but must be supported by being filled with compressed air, these being the so-called "pneumatic" or "inflatable" tires. I am also aware that tires arch-shaped in transverse section are broadly old. I do not therefore claim hollow or arch-shaped tires broadly; but, Having fully described my invention, what I claim, and desire to secure by Letters Patent, is—

1. The combination, with a rubber tire arch-shaped in cross-section, constructed to be self-sustaining, having its sides adapted to take an edgewise bearing, and inclosing an unoccupied arch-shaped space adapted in capacity to permit at one time the inward displacement of virtually the entire middle portion or crown of the tire, of a wheel-rim constructed with two annular seats arranged to extend under the sides of the tire and support the same in edgewise bearing, substantially as and for the purpose described, and whereby the weight imposed upon the tire is borne by the sides thereof, which are thus compressed and rendered stiffer than the middle or crowning portion of the tire, which yields inwardly and forms a virtually flat tread.

2. The combination, with a rubber tire arch-shaped in cross-section, constructed to be self-sustaining, having its sides adapted to take an edgewise bearing substantially in the plane of the wheel, and inclosing an unoccupied arch-shaped space adapted in capacity to permit at one time the inward displacement of virtually the entire middle portion or crown of the tire, of a wheel-rim constructed with two annular seats arranged to extend transversely under the sides of the tire and support the same in edgewise bearing, and a thin strip located wholly between the said sides of the tire at the lower ends thereof and resting upon the said bed, whereby the weight imposed upon the tire is borne by the sides thereof, which are thus compressed and rendered stiffer than the middle or crowning portion of the tire, which yields inwardly and forms a virtually flat tread, substantially as described.

ALBERT H. OVERMAN.

Witnesses:
 GEO. D. SEYMOUR,
 FRED C. EARLE.